US011836967B2

(12) United States Patent
Liu et al.

(10) Patent No.: US 11,836,967 B2
(45) Date of Patent: Dec. 5, 2023

(54) METHOD AND DEVICE FOR SMALL SAMPLE DEFECT CLASSIFICATION AND COMPUTING EQUIPMENT

(71) Applicant: GOERTEK INC., Shandong (CN)

(72) Inventors: Jie Liu, Shandong (CN); Jifeng Tian, Shandong (CN); Fuli Xie, Shandong (CN); Shunran Di, Shandong (CN); Yifan Zhang, Shandong (CN)

(73) Assignee: GOERTEK, INC., Shandong (CN)

( * ) Notice: Subject to any disclaimer, the term of this patent is extended or adjusted under 35 U.S.C. 154(b) by 490 days.

(21) Appl. No.: 17/275,800

(22) PCT Filed: Aug. 26, 2020

(86) PCT No.: PCT/CN2020/111213
§ 371 (c)(1),
(2) Date: Mar. 12, 2021

(87) PCT Pub. No.: WO2021/109627
PCT Pub. Date: Jun. 10, 2021

(65) Prior Publication Data
US 2022/0309764 A1    Sep. 29, 2022

(30) Foreign Application Priority Data
Dec. 3, 2019 (CN) .......................... 201911218786.3

(51) Int. Cl.
*G06V 10/764* (2022.01)
*G06V 10/82* (2022.01)
(Continued)

(52) U.S. Cl.
CPC ............. *G06V 10/764* (2022.01); *G06N 3/08* (2013.01); *G06V 10/26* (2022.01); *G06V 10/82* (2022.01)

(58) Field of Classification Search
CPC ...... G06V 10/764; G06V 10/26; G06V 10/82; G06N 3/08; G06N 3/042; G06N 3/045;
(Continued)

(56) References Cited

U.S. PATENT DOCUMENTS 9,058,544 B2 * 6/2015 Makkonen ........... G06V 30/424
10,579,042 B2 * 3/2020 Wang ................... G05B 19/406
(Continued)

FOREIGN PATENT DOCUMENTS

CN        101992862 A     3/2011
CN        104458748 A     3/2015
(Continued)

*Primary Examiner* — Juan A Torres
(74) *Attorney, Agent, or Firm* — LKGlobal | Lorenz & Kopf, LLP (57) ABSTRACT

A method and device for small sample defect classification and a computing equipment are disclosed. The method comprises: separating a target to be tested into parts, and segmenting an original image of the target to be tested into at least two sub-images containing different parts according to the separated parts; establishing small sample classification models with respect to each sub-image and the original image respectively, and obtaining a classification result of each sub-image and a classification result of the original image by using corresponding classification models, wherein the classification result includes a defect category and a corresponding category probability; and determining and outputting a defect category of the target to be tested according to classification results of all the sub-images and the original image.

20 Claims, 3 Drawing Sheets

(51) Int. Cl.
  *G06V 10/26* (2022.01)
  *G06N 3/08* (2023.01)
(58) Field of Classification Search
  CPC . G06T 7/0004; G06T 7/11; G06T 7/40; G06T 7/90; G06F 18/214
  USPC .......................................................... 382/181
  See application file for complete search history.

(56) References Cited

U.S. PATENT DOCUMENTS

| | | |
|---|---|---|
| 2010/0074516 A1 | 3/2010 | Kawaragi |
| 2013/0259374 A1 | 10/2013 | He et al. |

FOREIGN PATENT DOCUMENTS

| | | |
|---|---|---|
| CN | 109102500 A | 12/2018 |
| CN | 109239102 A | 1/2019 |
| CN | 109583489 A | 4/2019 |
| CN | 109584227 A | 4/2019 |
| CN | 109829914 A | 5/2019 |
| CN | 109949286 A | 6/2019 |
| CN | 110163858 A | 8/2019 |
| CN | 110223269 A | 9/2019 |
| CN | 110415214 A | 11/2019 |
| CN | 110530875 A | 12/2019 |
| CN | 111127571 A | 5/2020 |
| JP | 2004085503 A | 3/2004 |

\* cited by examiner

METHOD AND DEVICE FOR SMALL SAMPLE DEFECT CLASSIFICATION AND COMPUTING EQUIPMENT

CROSS REFERENCE TO RELATED APPLICATIONS

This application is a U.S. National Stage entry under 35 U.S.C. § 371 based on International Application No. PCT/CN2020/111213, filed on Aug. 26, 2020, which claims priority to Chinese Patent Application No. 201911218786.3, filed on Dec. 3, 2019. The above identified patent applications are hereby incorporated herein in their entirety by reference.

TECHNICAL FIELD

This Application pertains to the technical field of defect detection of industrial products, in particular to a method and device for small sample defect classification and a computing equipment.

BACKGROUND

In the manufacturing process of precision products, the products obtained often have various forms of defects (flaws) due to unstable processes, insufficient mechanical positioning accuracy, and environmental factors in the plant, etc. Conventionally, the product defect detection is usually completed by manual inspection, which requires a lot of labor and high work intensity, and is easy to cause fluctuations in inspection quality due to fatigue. With the continuous development of technology, automatic product defect classification methods based on artificial intelligence has been becoming an important part of the transformation from traditional precision manufacturing to intelligent manufacturing. However, in the early stage of product manufacturing, defective samples (products) are usually few, and the existing classification algorithms are difficult to meet the requirements of the production line, so the problem of missed detection often occurs. In addition, other objects, desirable features and characteristics will become apparent from the subsequent summary and detailed description, and the appended claims, taken in conjunction with the accompanying drawings and this background.

SUMMARY

In view of the problems of insufficient defect detection samples and missed detection in the prior art, the embodiments of the present disclosure present a method and device for small sample defect classification and a computing equipment to overcome the above problems.

In order to achieve the above objective, the following technical solutions are adopted in the embodiments of the present disclosure.

According to an aspect of the present disclosure, a method for small sample defect classification is provided. The method comprises:

separating a target to be tested into parts, and segmenting an original image of the target to be tested into at least two sub-images containing different parts according to the separated parts;

establishing small sample classification models with respect to each sub-image and the original image respectively, and obtaining a classification result of each sub-image and a classification result of the original image by using corresponding classification models, wherein the classification result includes a defect category and a corresponding category probability; and determining and outputting a defect category of the target to be tested according to classification results of all the sub-images and the original image.

According to another aspect of the present disclosure, a device for small sample defect classification is provided. The device comprises: a part separation module, a branch classification module, and a logic output module;

the part separation module is configured to separate a target to be tested into parts, and segment an original image of the target to be tested into at least two sub-images containing different parts according to the separated parts;

the branch classification module is configured to establish small sample classification models with respect to each sub-image and the original image respectively, and obtain a classification result of each sub-image and a classification result of the original image by using corresponding classification models, wherein the classification result includes a defect category and a corresponding category probability;

the logic output module is configured to determine and output a defect category of the target to be tested according to classification results of all the sub-images and the original image.

According to still another aspect of the present disclosure, a computing equipment device is provided. The computing equipment comprises: a memory and a processor, the memory and the processor are communicatively connected through an internal bus, and the memory stores program instructions executable by the processor. When the program instructions are executed by the processor, the method above is implemented.

In sum, the beneficial effects of the present disclosure are as follows:

The present disclosure separates a target to be tested into parts, and uses the separated parts and the target to be tested itself as multiple branches to perform defect classification respectively, which can reduce the complexity of defect recognition, thereby improving the accuracy of defect recognition and overcoming the problem of instability of results of traditional defect classification methods under a small sample situation.

BRIEF DESCRIPTION OF DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

In order to make the objectives, technical solutions and advantages of the present disclosure clearer, the embodiments of the present disclosure will be further described in detail below with reference to the accompanying drawings.

In the description of the present disclosure, it should be noted that, orientation or positional relationship indicated by the terms "center", "upper", "lower", "left", "right", "vertical", "horizontal", "inside", "outside", etc. are orientation or positional relationship based on the drawings, which are merely for convenience of describing the present disclosure and simplifying the description, rather than indicating or implying that the device or component referred to must have a specific orientation, or must be constructed and operated with a specific orientation, so they should not be construed as limiting the present disclosure. Moreover, the terms "first", "second" and "third" are used for descriptive purposes only and are not to be construed as indicating or implying relative importance.

In the description of the present disclosure, it should be noted that, unless otherwise expressly specified and limited, the terms "installation", "connected", "connection" should be broadly understood, for example, it may be fixedly connected, or detachably connected, or integrally connected; it may also be mechanically connected, or electrically connected; it may also be directly connected, or indirectly connected via an intermediate structure, or two components may be internally communicated. For a person of ordinary skill in the art, the specific meaning of the above terms in the present disclosure should be understood according to practice.

The technical concept of the present disclosure is as follows. The present disclosure separates a target to be tested into parts, and uses the separated parts and the target to be tested itself as multiple branches to perform defect classification respectively, which can reduce the complexity of defect recognition, thereby improving the accuracy of defect recognition and overcoming the problem of instability of results of traditional defect classification methods under a small sample situation.

Figure 1:
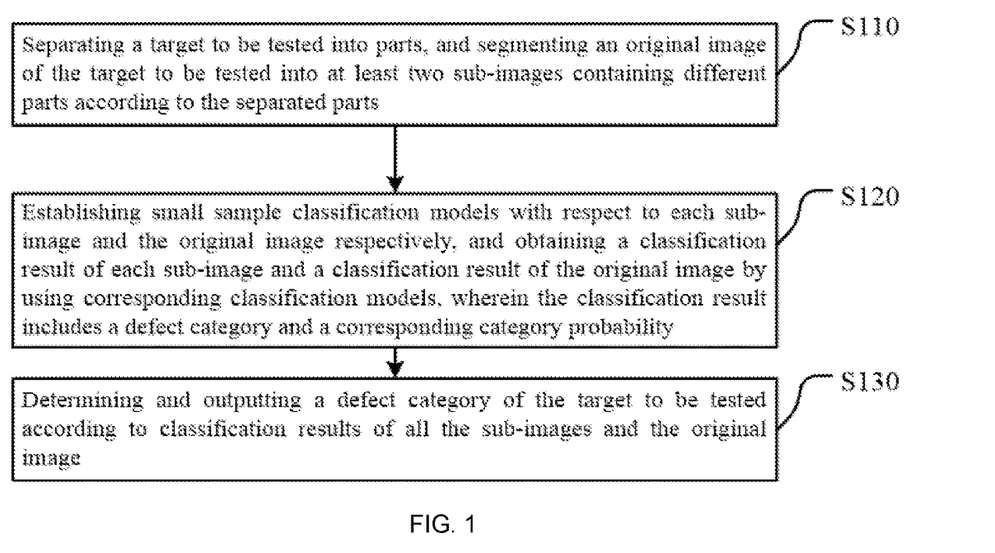
FIG. 1 is a schematic flowchart of a method for small sample defect classification according to an embodiment of the present disclosure.

FIG. 1 is a schematic flow chart of a method for small sample defect classification according to an embodiment of the present disclosure. The method can be applied to various workpiece inspections in the precision machining and manufacturing industry. As shown in FIG. 1, the method for small sample defect classification comprises:

Step S110: separating a target to be tested into parts, and segmenting an original image of the target to be tested into at least two sub-images containing different parts according to the separated parts.

The applicant finds in the practical work of identifying defect categories that the object to be tested, such as a workpiece, can often be separated into a primary part and a secondary part. The flawed features (such as defects) of the workpiece are often related to different parts, and the defects related to the primary part can reflect the defect category of the inspected workpiece more accurately and effectively. Therefore, if the defect classification is performed after separating the workpiece into parts, the performance of the classification algorithm can be significantly improved under a small sample situation.

Step S120: establishing small sample classification models with respect to each sub-image and the original image respectively, and obtaining a classification result of each sub-image and a classification result of the original image by using corresponding classification models, wherein the classification result includes a defect category and a corresponding category probability.

The segmented sub-images are classified by the classification algorithm, and the defect category information can be obtained with respect to each part, so the classification is more accurate. At the same time, in order to further improve the algorithm performance, the complete original image is also classified in the present embodiment, so as to obtain the defect information of the target to be tested as comprehensively as possible, and to achieve a comprehensive and accurate judgment on whether the target to be tested has a defect.

Step S130: determining and outputting a defect category of the target to be tested according to classification results of all the sub-images and the original image. Till now, the classification process of the branches of sub-images of multiple parts of the target to be tested and the branch of the complete original image according to the present embodiment has been completed, the defect information of the target to be tested can be comprehensively obtained and accurate defect judgments can be made.

Through the above embodiment, the present disclosure can classify and recognize the defect categories respectively from the perspective of the whole and each part of the target to be tested, thereby accurately and comprehensively obtaining the defect features of the target to be tested. Since each part after separation can usually highlight a certain type or several types of defect features, the present disclosure can more accurately identify important defect categories when the flawed samples are few, which overcomes the problem in the prior art that automatic defect detection algorithms need to be based on big data and large models in order to accurately identify the flawed features of the target (such as a workpiece) to be tested, and thus can better satisfy the requirements of industrial production lines.

In an embodiment of the present disclosure, separating a target to be tested into parts, and segmenting an original image of the target to be tested into at least two sub-images containing different parts according to the separated parts comprises one or more of the following methods:

Manner 1: based on the different functions of different parts, the original image of the target to be tested is segmented according to the functions;

Manner 2: based on the different positions of different parts, the original image of the target to be tested is segmented according to the positions;

Manner 3: based on the different appearance features of different parts, the original image of the target to be tested is segmented according to the appearance features.

The parts of the target to be tested have different functions, and their abilities to reflect flawed features are different. By dividing the parts into primary parts and secondary parts, they can be used to classify corresponding defects more accurately. In a preferred embodiment of the present disclosure, the target to be tested is separated into a primary part that plays a primary role in a target function and a secondary part that plays a secondary role in the target function, and the original image of the target to be tested is segmented into sub-images according to the primary and secondary parts. The division of the primary and secondary parts does not necessarily require that all parts be separated one by one, and both the primary and secondary parts can include one or more parts.

In addition, since the flawed features of the target to be tested are usually related to positions of different parts, the parts can also be separated according to positions, and the defects can be classified by different parts. Specifically, in a preferred embodiment, by determining one or more positional relationships of different parts among top-bottom relative positional relationship, left-right relative positional relationship, front-back relative positional relationship, and border-central area relative positional relationship, the original image of the target to be tested is segmented into sub-images according to the positional relationships.

Further, since different parts have different appearance features, the original image of the target to be tested can also be segmented according to appearance features. The appearance features of different parts may be, for example, recognizable features on the surface of the target to be tested such as color, texture, etc. In a preferred embodiment of the present disclosure, by determining the color or texture features of the different parts, the original image of the target to be tested is segmented into sub-images according to color or texture features. In this way, a segmented sub-image can be an image of a part whose color or texture features meet certain conditions (such as a certain threshold range).

Of course, in practical applications, the separability of the target image to be tested, the divisibility of flaw categories, and the overall performance of algorithm may be comprehensively considered to determine the number of parts to be separated and the specific separated parts.

For example, in an embodiment of the present disclosure, the above step S110 may specifically comprise: segmenting the original image of the target to be tested into a foreground image and a background image.

In an embodiment of the present disclosure, the method further comprises: setting priorities for different defect categories. Then step S130 further comprises: when the classification results of all the sub-images and the original image indicate that there is no defect, determining the target to be tested to be a good product; when at least one classification result of all the sub-images and the original image indicates that there is a defect, determining a defect category of the object to be tested according to classification results and priorities of defect categories.

Since the method for small sample defect classification of the present disclosure has multiple classification branches, there may be a problem that more than one defect is found by detection. In order to determine the most important defect, the present embodiment sets priorities for the defect categories so as to determine and output the most important defect category.

Preferably, in the present embodiment, one or more defect categories are set for each part, and different parts may have the same defect category, and the priorities of the same defect category of different parts may be the same or different.

In a preferred embodiment of the present disclosure, when at least one classification result of all the sub-images and the original image indicates that there is a defect, determining a defect category of the object to be tested according to classification results and priorities of defect categories comprises:

if the defect categories, in the classification results of all the sub-images and the original image, belong to different priorities, determining a defect category having a highest priority as the output result;

when the defect categories, in the classification results of all the sub-images and the original image, belong to a same priority, determining a defect category winning the most votes by a voting principle as the output result, and if the defect categories belong to a same priority win the same votes, continuing to compare category probabilities corresponding to the defect categories, and determining a defect category having a high category probability as the output result.

By using the priorities of the defect categories and comparing the category probabilities, the most important defect category can be determined to detect problems in industrial production lines and products and improve the quality of industrial products.

Figure 2:
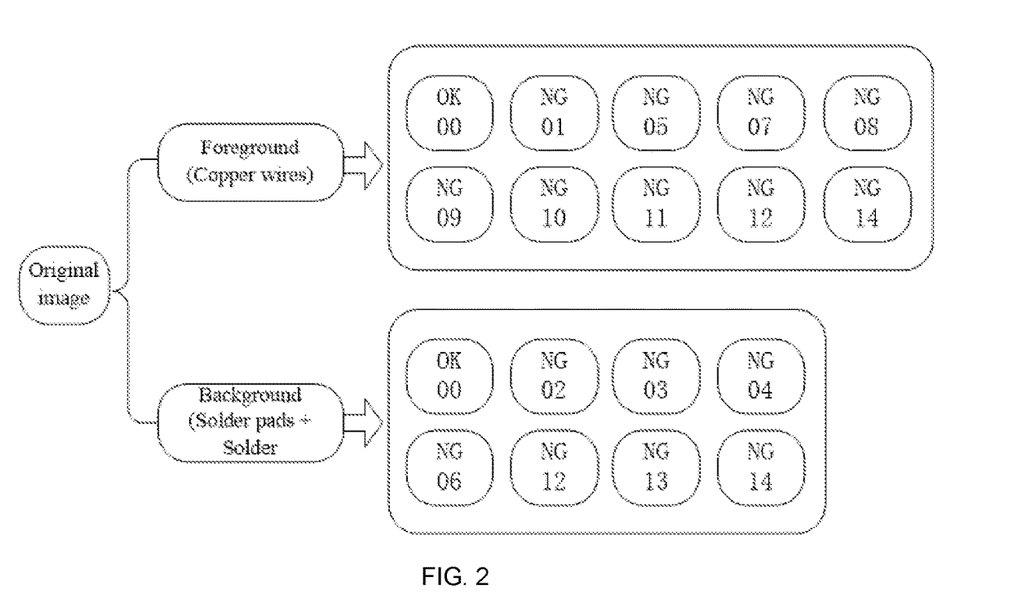
FIG. 2 is a schematic diagram of defect categories when an original image of a target to be tested is segmented into a foreground image and a background image according to an embodiment of the present disclosure.
Figure 3:
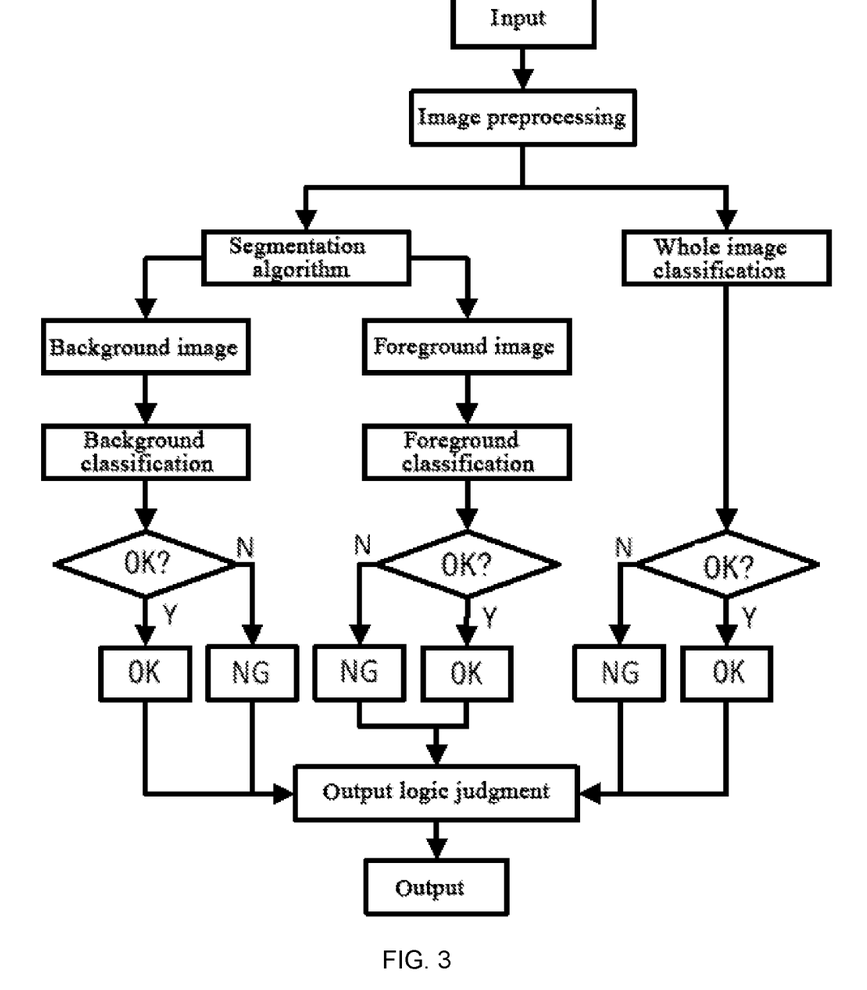
FIG. 3 is a schematic flowchart of defect classification of the target to be tested as shown in FIG. 2.

With reference to the embodiments shown in FIG. 2 and FIG. 3, a spot welding image which is common in industrial manufacturing is taken as the target to be tested to illustrate the working principle of the method for small sample defect classification of the present disclosure.

In the spot welding images common in industrial manufacturing, since solder pads and solder joints can adopt the defect feature of "impurity" to reflect the welding process problem, so they can be used as the primary parts that play a primary role, and thus solder pads and solder joints which are the primary parts can be separated from copper wires which are the secondary parts. In addition, according to the relative positional relationship, the copper wire is above the solder pad and the solder joint (i.e., in front of the front image), so image segmentation can also be realized based on the front-back positional relationship in the image. Further, the copper wire has a copper red color, while the solder pad and solder joint appear gray, so the copper wire can be separated from the solder pad and solder joint by the appearance feature of color.

In the present embodiment, as shown in FIG. 2, the original spot welding image is segmented into two portions: the foreground (copper wires) image and the background (solder pads+solder joints) image. The two sub-images of parts, i.e., the sub-image of copper wires and the sub-image of solder pads and solder joints, include various defects respectively. Some flaws (such as lifted lead, absence of lead, and lead residues, etc.) are only related to copper wires. Therefore, "lifted lead, absence of lead, and lead residues" are defect categories unique to copper wires. For example, defect categories such as those represented by serial numbers 01 and 05 in FIG. 2 are all unique defect categories of the part in the foreground image. Some flaws (such as impurities, overheating, etc.) are only related to solder pads and solder joints. Therefore, "impurities, overheating" are defect categories unique to solder pads+solder joints. For example, defect categories such as those represented by serial numbers 02 and 03 in FIG. 2 are all unique defect categories of the parts in the background image. Some flaws (solder ball, cutting-off, etc.) may be related to any of copper wires, solder pads, and solder joints. Therefore, "solder ball, cutting-off" are defect categories shared by copper wires, solder pads+solder joints (see category serial numbers 12 and 14 in FIG. 2). As shown in FIG. 2, the present embodiment segments the original spot welding image into two parts: the foreground (copper wires) image and the background (solder pads+solder joints) image. By splitting and assigning different defect categories to different parts, the performance of the classification algorithm can be significantly improved under a small samples situation.

Specifically, the image segmentation process in the present embodiment uses the existing Unet algorithm. The Unet algorithm includes a convolution part (feature extraction) and an up-sampling part. The feature scale of the convolution part gradually decreases with the increase of the number of convolution layers. The up-sampling part is used to restore the small-scale feature map generated by the convolution part to the original image size. The activation value before each pooling layer in the convolution part will be concatenated to the activation value of the corresponding up-sampling layer.

In the present embodiment, training samples are used to train the Unet algorithm model, and the original image is segmented using the Unet algorithm model after trained. The training samples are images that have been segmented into the foreground portion and the background portion. The foreground portion is marked as white pixels, and the background portion is marked as black pixels to form binary label data. The Unet network is trained by training samples and label data to obtain the trained segmentation model. Of course, other types of image segmentation algorithms can also be applied to the present disclosure, and will not be repeated here.

As shown in FIG. 2, in the classification and detection of the foreground and background sub-images after segmented, NG represents that the detection result indicates there is a flaw, and OK represents that the detection result is good. The numbers below NG and OK indicate the serial number of defect category, where 00 indicates a good product, i.e., there is no defect.

The overall framework of the algorithm in the present embodiment is shown in FIG. 3, and comprises the following process:

inputting the original image;

performing image preprocessing on the original image. Preferably, in the present embodiment, the original image of the target to be tested is preprocessed first, and the preprocessing comprises one or more of image size transformation, normalization of the target orientations in the image, etc., so as to make the image size more suitable for the corresponding segmentation algorithm model, and ensure that the orientations of workpiece in the image are consistent to improve the accuracy of the segmentation algorithm; and inputting the image after preprocessed to segmentation algorithm and whole image classification.

The original image after preprocessed is segmented into a foreground image and a background image using image segmentation algorithm; then the foreground image and the background image are classified using the foreground classification model and the background classification model respectively; at the same time, the whole image (complete original image) is classified using the whole image classification model; finally, the output results of the three classification models are comprehensively decided, and corresponding defect category serial numbers and category probabilities are output.

In the present embodiment, priorities are set for different defect categories, and the priorities set for the defect categories in the background image is higher than the priorities of the defect categories in the foreground image. For example, the defect categories set only for the foreground image in the classification model (such as the foreground classification model) include lifted lead, absence of lead, and lead residues;

the defect categories set only for the background image in the classification model (such as the background classification model) include impurities and overheating;

the defect categories set for both the foreground image and the background image in the classification models include solder ball and cutting-off. Namely, the defect categories of solder ball and cutting-off exist in both the foreground classification model and the background classification model.

In the present embodiment, the classification model of each branch adopts the TADAM (Task Dependent Adaptive Metric for Improved Few-shot Learning) algorithm model. With respect to each sub-image and original image, the corresponding TADAM algorithm models are trained and obtained respectively, and the classification results of each sub-image and the classification result of the original image are obtained using the corresponding TADAM algorithm models.

As shown in FIG. 3, the output results of the classification algorithm are OK (good product) or different NG serial numbers (defect categories), and the corresponding probabilities. Then the output logic judgment module finally determines the category of the image comprehensively based on the above results. For example, in the present embodiment, there are mainly the following three judgment manners:

The first manner: when the classification results of all the sub-images and the original image indicate that there is no defect, namely, when the outputs of the background branch, the foreground branch and the whole image branch are all OK, the output logic judgment module outputs OK, which means that the spot welding image has no defect.

The second manner: when at least one classification result of all the sub-images and the original image indicates that there is a defect, namely, when one of the outputs of the background branch, the foreground branch and the whole image branch is NG, the defect category of the target to be tested is determined according to the classification results and the priorities of defect categories. The second manner of judgment is further divided into the following two cases:

Case 1: If the defect categories in the classification results belong to different priorities, namely, when there is a branch outputting NG, and the defect categories of NG belong to different priorities, if there is only one higher priority, the defect category of this higher priority NG is directly output.

Case 2: If the defect categories in the classification results belong to the same priority, namely, when there is a branch outputting NG, and the defect categories of NG belong to the same priority, the voting principle will be adopted, and the defect category winning the most votes will be the output result. If the defect categories win the same votes, the values of the category probabilities corresponding to the defect categories will be used, and the defect category corresponding to a high value of category probability will be the output result.

To put it simply by taking the spot welding image of the present embodiment as an example, in the defect judgment of spot welding image, defects such as impurities (a judgment result output by the background branch) may be caused by process or machinery. If no measure is taken in time, it will cause more products defective. On the other hand, the lifted lead (a judgment result output by the foreground branch) is only caused by a single product, which is an accident. When it occurs, it can be handled only by accurately clamping it out. Therefore, the priority of the defect of impurities is higher than the defect of lifted lead. If the two types of defect (i.e., both impurities and lifted lead) appear in a product at the same time, the output needs to be the defect of impurities, so as to determine the most important defect category.

Figure 4:
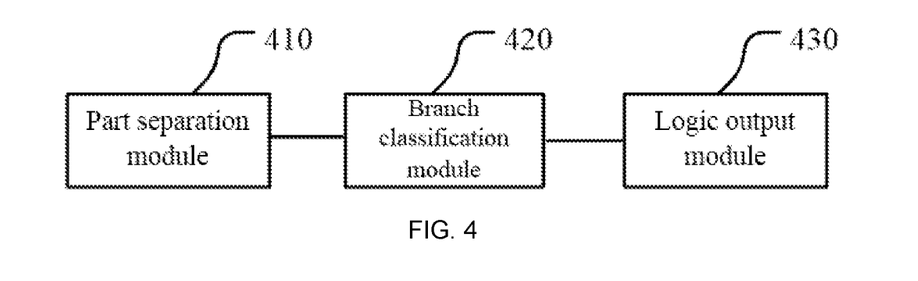
FIG. 4 is a schematic diagram of the structure of a device for small sample defect classification according to an embodiment of the present disclosure.

The present disclosure also discloses a device for small sample defect classification. As shown in FIG. 4, the device comprises: a part separation module 410, a branch classification module 420 and a logic output module 430.

The part separation module 410 is configured to separate a target to be tested into parts, and segment an original image of the target to be tested into at least two sub-images containing different parts according to the separated parts.

The branch classification module 420 is configured to establish small sample classification models with respect to each sub-image and the original image respectively, and obtain a classification result of each sub-image and a classification result of the original image by using corresponding classification models, wherein the classification result includes a defect category and a corresponding category probability.

The logic output module 430 is configured to determine and output a defect category of the target to be tested according to classification results of all the sub-images and the original image.

In a preferred embodiment of the present disclosure, the logic output module 430 is specifically configured to set priorities for different defect categories;

when the classification results of all the sub-images and the original image indicate that there is no defect, determine the target to be tested to be a good product;

when at least one classification result of all the sub-images and the original image indicates that there is a defect, determine a defect category of the object to be tested according to classification results and priorities of defect categories:

if the defect categories, in the classification results of all the sub-images and the original image, belong to different priorities, determine a defect category having a highest priority as the output result;

when the defect categories, in the classification results of all the sub-images and the original image, belong to the same priority, determining a defect category winning the most votes by a voting principle as the output result, and if the defect categories belong to the same priority win the same votes, continue to compare category probabilities corresponding to the defect categories, and determine a defect category having a high category probability as the output result.

In a preferred embodiment of the present disclosure, the logic output module 430 sets one or more defect categories for each part, and the priority of the same defect category of different parts may be the same or different.

In a preferred embodiment of the present disclosure, the part separation module 410 is specifically configured to:

based on different functions of different parts, segment the original image of the target to be tested according to functions; and/or based on different positions of different parts, segment the original image of the target to be tested according to positions; and/or based on different appearance features of different parts, segment the original image of the target to be tested according to appearance features.

In an embodiment of the present disclosure, the part separation module 410 may be specifically configured to separate the target to be tested into a primary part that plays a primary role in a target function and a secondary part that plays a secondary role in the target function, and segment the original image of the target to be tested into sub-images according to the primary and secondary parts; and/or, determine one or more positional relationships of different parts among top-bottom, left-right, front-back, and border-central area relative positional relationships, and segment the original image of the target to be tested into sub-images according to the positional relationship; and/or, determine color or texture features of different parts, and segment the original image of the target to be tested into sub-images according to the color or texture features.

In an embodiment of the present disclosure, the part separation module 410 may be further specifically configured to segment the original image of the target to be tested into a foreground image and a background image containing different parts, and the foreground image and the background image are sub-images after segmented.

In an embodiment of the present disclosure, when selecting the corresponding algorithm model, the part separation module 410 chooses to use the Unet algorithm model, uses the training samples to train the Unet algorithm model, and segments the original image by using the Unet algorithm model after trained. The branch classification module 420 chooses to use the TADAM algorithm model, trains and obtains the corresponding TADAM algorithm models with respect to each sub-image and the original image, respectively, and obtains the classification result of each sub-image and the classification result of the original image using the corresponding TADAM algorithm models, respectively.

In an embodiment of the present disclosure, the device for small sample defect classification further comprises an image preprocessing module, which is configured to perform preprocessing on the target image to be tested before separating the target image to be tested into parts, and the preprocessing comprises image size transformation and/or normalization of target orientations in the image, to make the image better fit the algorithm model.

Further, when the original image is a spot welding image, the branch classification module 420 is further specifically configured to, set the defect categories only for the foreground image in the classification model to include lifted lead, absence of lead, and lead residues; set the defect categories only for the background image in the classification model to include impurities and overheating; set the defect categories for both the foreground image and the background image in the classification model to include solder ball and cutting-off.

The specific implementation methods and functions of the modules of the device for small sample defect classification of the present disclosure correspond to the steps of the above method for small sample defect classification, and will not be repeated here.

In sum, the present disclosure separates a target to be tested into parts, uses the separated parts and the target to be tested itself as multiple branches to perform defect classification respectively, and splits different defect categories to apply on different parts in detection, which can reduce the complexity of defect recognition, significantly improve the performance of the classification algorithm using a small sample, thereby improving the accuracy of defect recognition and overcoming the problem of instability of results of traditional defect classification methods under a small sample situation.

Figure 5:
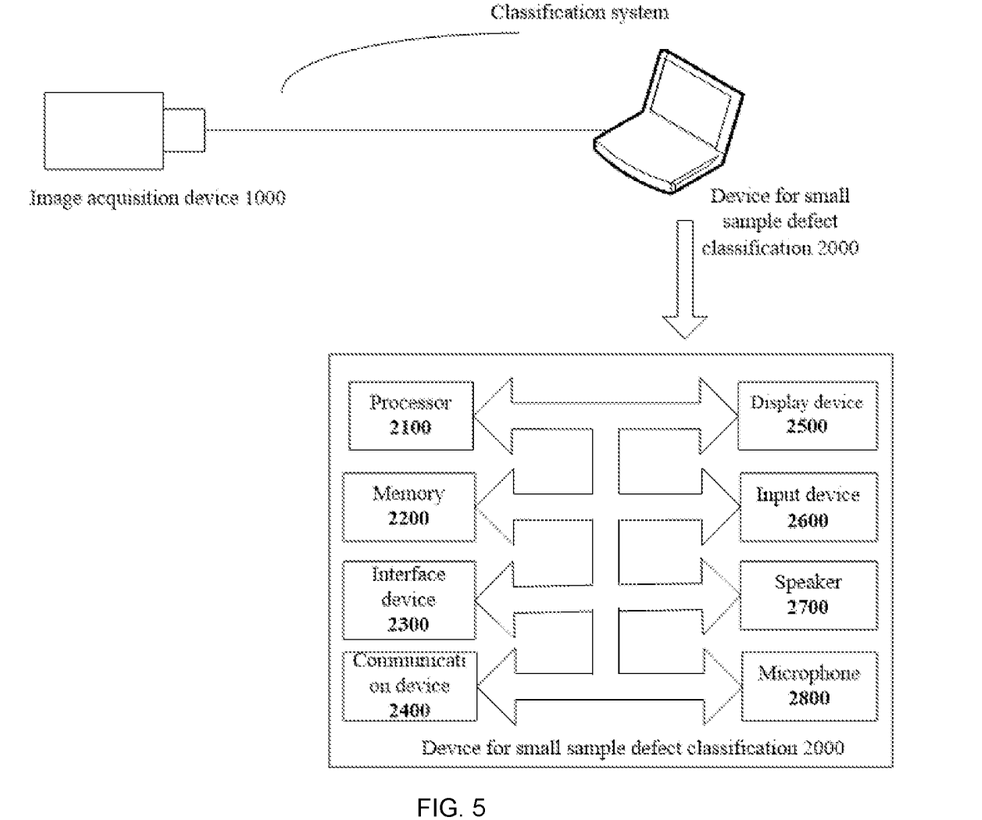
FIG. 5 is a schematic diagram of a small sample defect classification system according to an embodiment of the present disclosure.

FIG. 5 is a block diagram of the hardware configuration of a small sample defect classification system according to an embodiment of the present disclosure.

As shown in FIG. 5, the small sample defect classification system comprises an image acquisition device 1000 and a device for small sample defect classification 2000.

The image acquisition device 1000 is configured to acquire a target image and provide the acquired target image to the device for small sample defect classification 2000.

The image acquisition device 1000 may be any imaging device capable of taking pictures of the target to be detected, such as a camera, etc.

The device for small sample defect classification 2000 may be any electronic device, such as a PC, a notebook computer, a server, etc.

In the present embodiment, referring to FIG. 1, the device for small sample defect classification 2000 may comprise a processor 2100, a memory 2200, an interface device 2300, a communication device 2400, a display device 2500, an input device 2600, a speaker 2700, a microphone 2800, etc.

The processor 2100 may be a mobile version processor. The memory 2200 includes, for example, ROM (Read Only Memory), RAM (Random Access Memory), nonvolatile memory such as a hard disk, etc. The interface device 2300 includes, for example, a USB interface, a headphone interface, etc. The communication device 2400 can, for example, perform wired or wireless communication. The communication device 2400 may include short-range communication devices, for example, any device that performs short-range wireless communication based on a short-range wireless communication protocol such as Hilink protocol, WiFi (IEEE 802.11 protocol), Mesh, Bluetooth, ZigBee, Thread, Z-Wave, NFC, UWB, LiFi, etc. The communication device 2400 may also include a remote communication device, for example, any device that performs WLAN, GPRS, 2G/3G/4G/5G remote communication. The display device 2500 is, for example, a liquid crystal display screen, a touch screen, etc. The display device 2500 is configured to display the target image acquired by the image acquisition device. The input device 2600 may include, for example, a touch screen, a keyboard, etc. The user can input/output voice information through the speaker 2700 and the microphone 2800.

In the present embodiment, the memory 2200 of the device for small sample defect classification 2000 is configured to store instructions, which are used to control the processor 2100 to operate so as to at least execute the target detection method according to any embodiment of the present disclosure. A person skilled in the art can design instructions according to the solutions disclosed in the present disclosure. It is well known in the art how the instructions control the processor to operate, and thus will not be described in detail here.

Although multiple devices of the device for small sample defect classification 2000 are shown in FIG. 5, the present disclosure may only involve some of the devices. For example, the device for small sample defect classification 2000 only involves the memory 2200, the processor 2100, and the display device 2500.

In the present embodiment, the image acquisition device is configured to acquire a target image and provide it to the device for small sample defect classification 2000, and the device for small sample defect classification 2000 implements the method according to any embodiment of the present disclosure based on the target image.

It will be appreciated that, although FIG. 5 only shows one image acquisition device 1000 and one device for small sample defect classification 2000, it does not mean to limit their respective numbers. The classification system may comprise a plurality of image acquisition devices 1000 and/or small sample defect classification devices 2000.

Figure 6:
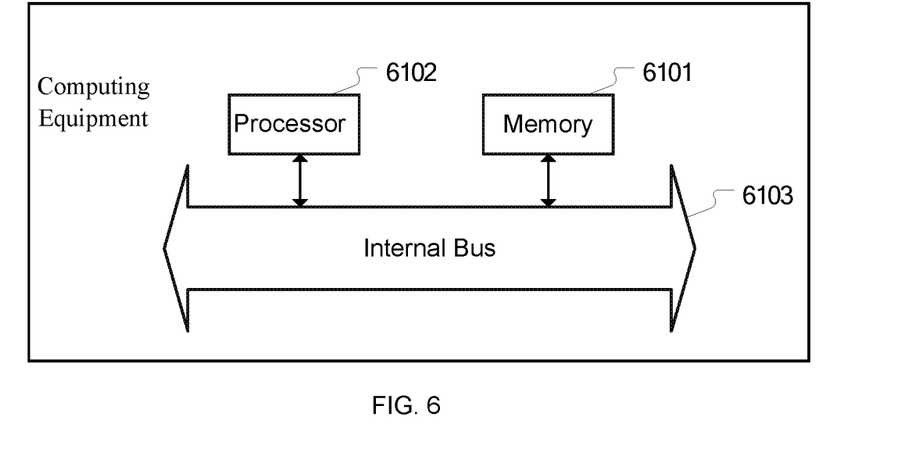
FIG. 6 is a schematic diagram of the structure of a computing equipment according to an embodiment of the present disclosure.

FIG. 6 is a schematic diagram of the structure of a computing equipment according to an embodiment of the present disclosure. As shown in FIG. 6, the computing equipment comprises a memory 6101 and a processor 6102. The memory 6101 and the processor 6102 are communicatively connected via an internal bus 6103. The memory 6101 stores program instructions that can be executed by the processor 6102, and when the program instructions are executed by the device 6102, the classification methods in the foregoing embodiments can be implemented.

In addition, the above logic instructions in the memory 6101 can be implemented in the form of a software functional unit, and when sold or used as an independent product, they can be stored in a computer readable storage medium. Based on such an understanding, the substance of the technical solutions of the present disclosure or the part that contributes to the prior art or part of the technical solution may be reflected in the form of a software product, the computer software product may be stored in one storage medium and include several instructions for causing a computer device (which may be a personal computer, a server, or a network device) to fully or partially perform the method described in the various embodiments of the present disclosure. The aforesaid storage medium includes various media capable of storing program codes such as a USB disk, a mobile storage device, a Read Only Memory (ROM), a Random Access Memory (RAM), a magnetic disk, or an optical disk, etc.

Another embodiment of the present disclosure provides a computer-readable storage medium, and the computer-readable storage medium stores computer instructions, and the computer instructions cause the computer to execute the above method.

As will be appreciated by a person skilled in the art, the embodiments of the present disclosure may be provided as methods, systems, or computer program products. Therefore, the present disclosure may take the form of an entirely hardware embodiment, an entirely software embodiment or an embodiment combining software and hardware. Moreover, the present disclosure may take the form of a computer program product employing one or more computer-readable media (including but not limited to disk storage, CD-ROM, optical storage, etc.) having computer readable program codes embodied thereon.

The above merely describe particular embodiments of the present disclosure. By the teaching of the present disclosure, a person skilled in the art can make other modifications or variations based on the above embodiments. A person skilled in the art should appreciate that, the detailed description above is only for the purpose of better explaining the present disclosure, and the protection scope of the present disclosure should be subject to the protection scope of the claims.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method for small sample defect classification, comprising:
separating a target to be tested into parts, and segmenting an original image of the target to be tested into at least two sub-images containing different parts according to the separated parts;
establishing small sample classification models with respect to each sub-image and the original image respectively, and obtaining a classification result of each sub-image and a classification result of the original image by using corresponding classification models, wherein the classification result includes a defect category and a corresponding category probability; and
determining and outputting a defect category of the target to be tested according to classification results of all the sub-images and the original image.

2. The method according to claim 1, wherein separating a target to be tested into parts, and segmenting an original image of the target to be tested into at least two sub-images containing different parts according to the separated parts comprises:
based on different functions of different parts, segmenting the original image of the target to be tested according to functions; and/or
based on different positions of different parts, segmenting the original image of the target to be tested according to positions; and/or
based on different appearance features of different parts, segmenting the original image of the target to be tested according to appearance features.

3. The method according to claim 2, comprising:
separating the target to be tested into a primary part that plays a primary role in a target function and a secondary part that plays a secondary role in the target function, and segmenting the original image of the target to be tested into sub-images according to the primary part and the secondary part; and/or,
determining one or more positional relationships of different parts among top-bottom, left-right, front-back, and border-central area relative positional relationships, and segmenting the original image of the target to be tested into sub-images according to the positional relationship; and/or,
determining color or texture features of different parts, and segmenting the original image of the target to be tested into sub-images according to the color or texture features.

4. The method according to claim 1, wherein separating a target to be tested into parts, and segmenting an original image of the target to be tested into at least two sub-images containing different parts according to the separated parts comprises:
segmenting the original image of the target to be tested into a foreground image and a background image which contain different parts.

5. The method according to claim 1, wherein separating a target to be tested into parts, and segmenting an original image of the target to be tested into at least two sub-images containing different parts according to the separated parts comprises:
training a Unet algorithm model using training samples, and segmenting the original image using the Unet algorithm model after trained;
establishing small sample classification models with respect to each sub-image and the original image respectively, and obtaining a classification result of each sub-image and a classification result of the original image by using corresponding classification models comprises:
with respect to each sub-image and the original image, training and obtaining corresponding TADAM algorithm models respectively, and obtaining a classification result of each sub-image and a classification result of the original image using corresponding TADAM algorithm models respectively.

6. The method according to claim 1, further comprising:
setting priorities for different defect categories; and
determining and outputting a defect category of the target to be tested according to classification results of all the sub-images and the original image comprises:
when the classification results of all the sub-images and the original image indicate that there is no defect, determining the target to be tested to be a good product;
when at least one classification result of all the sub-images and the original image indicates that there is a defect, determining a defect category of the object to be tested according to classification results and priorities of defect categories.

7. The method according to claim 6, wherein when at least one classification result of all the sub-images and the original image indicates that there is a defect, determining a defect category of the object to be tested according to classification results and priorities of defect categories comprises:
if the defect categories, in the classification results of all the sub-images and the original image, belong to different priorities, determining a defect category having a highest priority as an output result;
when the defect categories belong to a same priority, determining a defect category winning most votes by a voting principle as an output result, and if the defect categories belong to the same priority win same votes, continuing to compare category probabilities corresponding to the defect categories, and determining a defect category having a high category probability as an output result.

8. The method according to claim 6, further comprising:
setting one or more defect categories for each part, wherein a priority of a same defect category of different parts is same or different.

9. The method according to claim 1, further comprising:
performing preprocessing on the target image to be tested before separating the target image to be tested into parts, wherein the preprocessing comprises image size transformation and/or normalization of target orientations in the image.

10. The method according to claim 1, wherein the original image is a spot welding image, and the method further comprises:
segmenting the spot welding image into a foreground image containing copper wires and a background image containing solder pads and solder joints.

11. The method according to claim 10, further comprising:
setting priorities for different defect categories, wherein priorities set for defect categories in the background image are higher than priorities set for defect categories in the foreground image;
the defect categories set only for the foreground image in the classification model include lifted lead, absence of lead, and lead residues;

the defect categories set only for the background image in the classification model include impurities and overheating;

the defect categories set for both the foreground image and the background image in the classification models include solder ball and cutting-off.

12. A computing equipment, comprising: a memory and a processor, the memory and the processor are communicatively connected via an internal bus, the memory stores program instructions executable by the processor, and when the program instructions are executed by the processor, the method according to claim 1 is implemented.

13. The equipment according to claim 12, wherein separating a target to be tested into parts, and segmenting an original image of the target to be tested into at least two sub-images containing different parts according to the separated parts comprises:

based on different functions of different parts, segmenting the original image of the target to be tested according to functions; and/or based on different positions of different parts, segmenting the original image of the target to be tested according to positions; and/or based on different appearance features of different parts, segmenting the original image of the target to be tested according to appearance features.

14. The equipment according to claim 13, comprising:

separating the target to be tested into a primary part that plays a primary role in a target function and a secondary part that plays a secondary role in the target function, and segmenting the original image of the target to be tested into sub-images according to the primary part and the secondary part; and/or, determining one or more positional relationships of different parts among top-bottom, left-right, front-back, and border-central area relative positional relationships, and segmenting the original image of the target to be tested into sub-images according to the positional relationship; and/or, determining color or texture features of different parts, and segmenting the original image of the target to be tested into sub-images according to the color or texture features.

15. A device for small sample defect classification, comprising: a part separation module, a branch classification module, and a logic output module;

the part separation module is configured to separate a target to be tested into parts, and segment an original image of the target to be tested into at least two sub-images containing different parts according to the separated parts;

the branch classification module is configured to establish small sample classification models with respect to each sub-image and the original image respectively, and obtain a classification result of each sub-image and a classification result of the original image by using corresponding classification models, wherein the classification result includes a defect category and a corresponding category probability; and the logic output module is configured to determine and output a defect category of the target to be tested according to classification results of all the sub-images and the original image.

16. The device according to claim 15, wherein the logic output module is specifically configured to:

set priorities for different defect categories;

when the classification results of all the sub-images and the original image indicate that there is no defect, determine the target to be tested to be a good product;

when at least one classification result of all the sub-images and the original image indicates that there is a defect, determine a defect category of the object to be tested according to classification results and priorities of defect categories:

if the defect categories belong to different priorities, determine a defect category having a highest priority as an output result;

when the defect categories belong to a same priority, determine a defect category winning most votes by a voting principle as an output result, and if the defect categories belongs to the same priority win same votes, continue to compare category probabilities corresponding to the defect categories, and determine a defect category having a high category probability as an output result.

17. The device according to claim 15, wherein the part separation module is specifically configured to based on different functions of different parts, segment the original image of the target to be tested according to functions; and/or based on different positions of different parts, segment the original image of the target to be tested according to positions; and/or based on different appearance features of different parts, segment the original image of the target to be tested according to appearance features.

18. The device according to claim 15, wherein the part separation module is specifically configured to separate the target to be tested into a primary part that plays a primary role in a target function and a secondary part that plays a secondary role in the target function, and segment the original image of the target to be tested into sub-images according to the primary part and the secondary part; and/or, determine one or more positional relationships of different parts among top-bottom, left-right, front-back, and border-central area relative positional relationships, and segment the original image of the target to be tested into sub-images according to the positional relationship; and/or, determine color or texture features of different parts, and segment the original image of the target to be tested into sub-images according to color or texture features.

19. The device according to claim 15, wherein the part separation module is specifically further configured to segment the original image of the target to be tested into a foreground image and a background image which contain different parts, and the foreground image and the background image are sub-images after segmented.

20. The device according to claim 15, wherein the original image is a spot welding image, the branch classification module is specifically configured to set the defect categories only for the foreground image in the classification model to include lifted lead, absence of lead, and lead residues;

set the defect categories only for the background image in the classification model to include impurities and overheating; and set the defect categories for both the foreground image and the background image in the classification models to include solder ball and cutting-off.

* * * * *